Patented Dec. 28, 1937

2,103,762

UNITED STATES PATENT OFFICE 2,103,762

PROCESS FOR REFINING METALS

Jesse O. Betterton, Metuchen, N. J., and Charles N. Waterman, Monterrey, Mexico, assignors to American Smelting and Refining Company, New York, N. Y., a corporation of New Jersey No Drawing. Application July 3, 1934, Serial No. 733,624

4 Claims. (Cl. 75—76)

The present invention provides an improved process for salvaging brass and bronze secondary metals and miscellaneous copper alloy scrap to recover the metallic values contained therein, and more particularly provides a process whereby a substantially complete separation of the zinc, tin and lead from the copper may be accomplished.

A common procedure for salvaging metal values from brass and bronze secondary metals is to melt the charge and blow with air in a converter to remove the volatile metals, namely, zinc, tin and lead, and to subsequently refine the residual blister copper either by the usual fire refining methods or by electrolytic refining. This blowing operation oxidizes the zinc, tin and lead which are removed from the copper as a mixed dust or fume, and collected in a baghouse. Cottrell plant, settling chamber, or other means; and while various processes have been proposed for separating the zinc from the lead and tin oxides, for example by leaching with sulphuric acid, only a partial recovery of these metals is obtained and the cost of the recovery is relatively high.

The present invention has for one of its general objects the providing of an improved process for separating the zinc, tin and lead from the copper contained in brass, bronze and miscellaneous copper alloy scrap.

A further object of the invention is to provide a process wherein chlorine gas may be efficiently employed to remove the zinc, lead and tin from the copper of the bronze or brass, while leaving the copper relatively unaffected, the chlorides resulting from the reaction being collected in a slag which is separated from the residual metal and may be further treated for the recovery of the values therein.

Other objects of the invention will appear hereinafter, the novel features and combinations being set forth in the appended claims.

In accordance with the present improved process, the alloy to be refined was melted in a clean graphite crucible in a suitable furnace. The dross was not skimmed, being small in quantity, though the dross may be skimmed off if it is desirable to do so. Chlorine from a suitable source, such as a chlorine machine of any standard construction, was bubbled through the molten metal, the volatile chlorides fuming off, the chlorine being passed into the metal bath until a fluid copper chloride slag formed on the bath. The charge then was poured and the slag separated from the metal. The chlorine was introduced into the bath through a graphite pipe inserted therein.

The process of the present invention is based upon the fact that the metals entering into the composition of the copper alloys contemplated to be included in the treatment by the present process are characterized by markedly different affinities for chlorine, in consequence of which one or more of the constituent metals may be wholly or in large part converted into chloride under conditions wherein the chlorine has but little effect on one or more of the other metals.

The process is illustrated by the following specific examples:

*Example No. 1*

Bronze, in the form of bronze gear scrap, was melted in a graphite crucible, 30.7 parts by weight being charged into the crucible. The bronze analyzed Cu—83.0%, Sn—11.8%, Zn—4.10%, Pb—1.05%. The bronze was melted and chlorine gas passed into the melt sufficiently slowly so that virtual complete absorption of the chlorine was obtained. After approximately 2.5 parts by weight of chlorine had been passed into the charge, it was found necessary to stop the passage of chlorine and to reheat the charge. A sample of the bath taken at this point analyzed Cu—90.5%, Pb—0.00%, Zn—0.00%, Sn—9.4%.

After reheating the bath, the chlorine treatment was continued until additionally 3.5 parts by weight of chlorine had been passed into the bath, the chlorine treatment being discontinued upon there forming a fluid slag on the bath. It was found necessary to interrupt the treatment again and reheat the charge between the first reheating and the formation of this fluid slag.

When the formation of this slag took place, the flow of chlorine was stopped and the metal and slag were tapped, the slag being separated from the metal and preserved for treatment to recover the values therein. There were recovered from the charge 23.4 parts by weight of metal and 3.6 parts by weight of slag, the metal analyzing Cu—94.5%, Pb—0.0%, Zb—0.0% and Sn—5.5%.

*Example No. 2*

Brass, in the form of brass tube scrap was melted in a graphite crucible as above in Example No. 1, 30.0 parts by weight of the brass being placed in the crucible and melted. The brass analyzed Cu—69.5%, Zn—29.2%, Pb—1.21%, Sn—0.03%. When the brass was thoroughly melted, chlorine was passed into the charge until a slag formed on the metal. It was not necessary to reheat the charge at any time, the heat of reaction being more than sufficient to keep the bath molten. The chlorine was added sufficiently slowly so as to enable substantially complete absorption thereof by the bath.

When the fluid slag formed on the bath, 13.25 parts by weight of chlorine had been used. The slag and metal were tapped, 17.9 parts by weight of metal and 5.5 parts by weight of chloride slag were recovered. The metal analyzed 99.8% Cu, and there were no determinable amounts of zinc, lead or tin present therein.

The slag analyzed Cu—48.2%, Zn—13.2%, Pb—0.77%, Sn—0.00%.

Example No. 3

A selective separation of the zinc and lead may be accomplished by suitable adjustment of the chlorine treatment. Thus, 50 parts by weight of bronze were melted in a graphite crucible at a temperature ranging from 1100° to 1150° C., and after melting a sample of the metal was taken and analyzed. The analysis showed 8.8% Sn, 11.9% Zn, 11.4% Pb and 65.0% Cu.

The melt in the crucible was covered with a thin layer of coke, and chlorine gas was passed into the melt, the temperature of which was maintained at substantially the above limits, the chlorine being introduced at the rate of about 1 part by weight of chlorine per hour, which was found to be as rapidly as was permissible with complete absorption of the chlorine. A total of 4.4 parts by weight of chlorine were passed into the melt over a period of seven hours.

The cover slag was removed and a sample thereof analyzed 7.6% Sn, 2.35% Zn, 4.4% Pb, 19.6% Cu. The remaining metal was weighed and analyzed.

There were recovered 32.4 parts by weight of metal, analyzing 8.8% Sn, 2.0% Zn, 0.6% Pb and 88.6% Cu (by difference).

The metal was returned to the crucible, heated to temperature and 2.1 parts by weight of chlorine were passed into the molten charge over a period of six hours, the metal charge, as formerly, being protected by a thin layer of coke. There were recovered 28.1 parts by weight of metal analyzing 6.0% Sn, 0.7% Zn, trace of Pb and 91.6% Cu.

It will be seen, therefore, that additions of regulated amounts of chlorine to the molten brass or bronze will effect selective separations of, first, zinc, and second, lead, leaving the tin and copper; or, if desired, the chlorine treatment may be stopped after the separation of the zinc, so as to obtain a selective separation of zinc only.

In the treatment of both bronze and brass, it was observed that as soon as chlorine was started bubbling through the metal, white fuming began, which gradually diminished and changed to a yellowish color. At the end the fuming is less than half what it was at the start. As the reaction proceeded, it was noted that the rate of chlorine addition can be greatly increased, and at the end the bath was absorbing a full stream of chlorine.

There was more dross on the molten brass tube scrap than there was on the molten bronze gear scrap. This would be expected from the higher zinc content of the tube scrap and accounts for the higher zinc content of the chloride slag.

It will be observed from the above illustrations that bronze when treated with chlorine was completely deleaded and dezinced before the formation of copper chloride and the tin content was reduced from 11.8% to 5.4% during the treatment; while the brass when treated with chlorine in the above-indicated manner, was completely freed of lead, tin and zinc.

The above described procedure may be modified, if desired, in accordance with given conditions. Thus, for example, in the case of bronze, the bronze may be melted as above described, and chlorine passed in until the visible change in fuming indicates that all zinc and lead are removed. The charge may then be blown with air to complete the detinning thereof; or an alternate heating and blowing of the charge may be carried out until no further reduction in the tin content of the metal is effected. This treatment is illustrated by the following specific example.

Example No. 4

Forty parts by weight of bronze gear scrap, analyzing 12.2% Sn, 2.1% Pb, 5.0% Zn, and 80.7% Cu (by difference) were melted, and chlorine gas was passed into the molten charge until there was a visible change in fuming, which took place in about 15 minutes. The metal was poured, and was found to analyze 7.3% Sn, 0.0% Pb, 0.0% Zn, and 92.7% Cu (by difference). It will thus be seen that the lead and zinc had been entirely removed by the brief chlorine treatment.

The metal was remelted, and alternately heated and blown with air for two hours. The dross was separated, and the metal analyzed for tin. It was found to contain 6.1% of tin. The melting was repeated and the molten charge was alternately heated and blown with air for a period of one hour, no further dross being formed, a fine fume being given off instead. When analyzed, the metal showed a tin content of 6.0% and, by difference, 94.0% of copper.

It will be seen, therefore, that the present process affords a simple treatment for deleading and dezincing brass and bronze, a very substantial elimination of tin being also effected. The fume and slag formed during the operation may be recovered and treated for recovering the metal values thereof. In addition to chlorine, other halogens may be employed in a similar manner.

While certain novel features of the invention have been disclosed and are pointed out in the annexed claims, it will be understood that various omissions, substitutions, and changes may be made by those skilled in the art, and that it is intended and desired to embrace within the scope of this invention such modifications and changes as may be necessary to adapt it to varying conditions and uses.

What is claimed is:

1. The process of treating copper alloys containing zinc, lead and tin which comprises forming a bath of the alloys, and halogenizing the resulting bath until a partial elimination of the tin and substantially complete elimination of zinc and lead is effected thereby leaving a refined copper-tin alloy in marketable condition as a residue.

2. The process of treating bronze scrap which comprises melting the scrap, passing chlorine into the scrap until the zinc and lead are substantially completely eliminated and the tin content of the bronze has been substantially reduced, and recovering a marketable copper-tin alloy as a resdue.

3. The process of treating bronze scrap which comprises melting the scrap, passing chlorine into the molten scrap until the zinc and lead are substantially completely eliminated and the tin content of the bronze has been substantially reduced, further reducing the residual tin content by blowing the molten scrap with air, and recovering the remaining metal as a marketable copper-tin alloy.

4. A process of treating copper alloys containing zinc, lead and tin which comprises effecting a selective separation of the zinc, lead and tin, in the order named, from the copper by passing chlorine into a molten bath of the alloy.

JESSE O. BETTERTON.
CHARLES N. WATERMAN.